United States Patent [19]

Minkiewicz et al.

[11] 4,213,555
[45] Jul. 22, 1980

[54] METHOD AND APPARATUS FOR AUTOMATIC WELDING OF BEVELLED TUBES

[75] Inventors: André E. Minkiewicz, Fontenay aux Roses; Norbert Poirier, Paris, both of France

[73] Assignee: Compagnie Francaise des Petroles, Paris, France

[21] Appl. No.: 892,355

[22] Filed: Mar. 31, 1978

[30] Foreign Application Priority Data

Mar. 31, 1977 [FR] France .................. 77 09824

[51] Int. Cl.² ............................................. B23K 9/02
[52] U.S. Cl. ......................................... 228/29; 228/50; 219/60 A
[58] Field of Search ............... 228/29, 5.1, 44.5, 49 B, 228/50, 216, 225; 49/60 A, 137 R

[56] References Cited

U.S. PATENT DOCUMENTS

| 3,207,881 | 9/1965 | Pagan | 219/60 A |
| 3,293,400 | 12/1966 | Brogdon | 219/73 R |
| 3,432,915 | 3/1969 | Doyle | 228/50 X |

Primary Examiner—Francis S. Husar
Assistant Examiner—K. J. Ramsey
Attorney, Agent, or Firm—Sughrue, Rothwell, Mion, Zinn and Macpeak

[57] ABSTRACT

In the welding of tubes with bevelled ends without heels or root-faces, all the weldings beads are made from the outside of the tubes with the tubes being in contact with local gap not exceeding 2 mm. The first and second welding beads are made both by the up-hill method and the down-hill method with the axis of the welding torches at the same inclination to the normal or the radius of the pipe and the accuracy of welding is improved by the use of mechanical guiding means for the welding means comprising at least one roller which bears on the bevelled ends of the tubes adjacent the welding zone.

11 Claims, 33 Drawing Figures

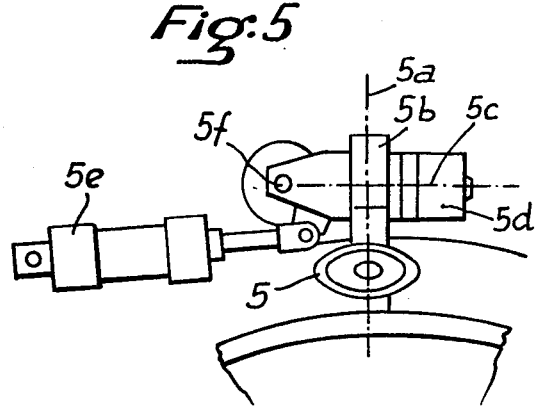
Fig:5
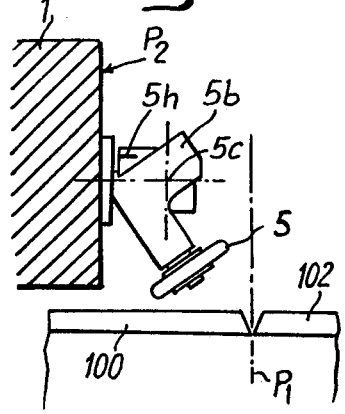
Fig:6
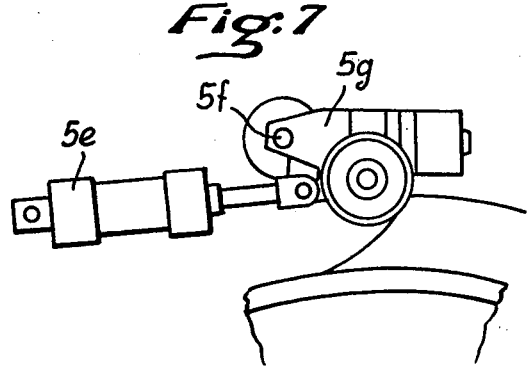
Fig:7
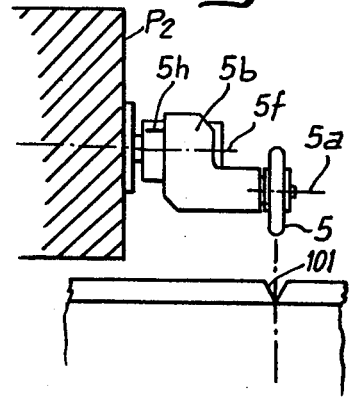
Fig:8
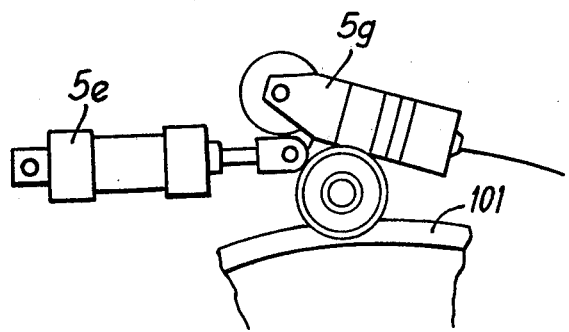
Fig:9
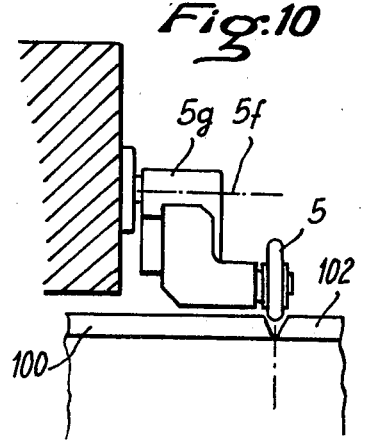
Fig:10

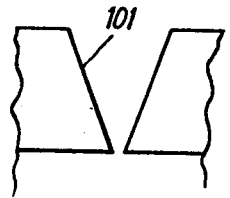
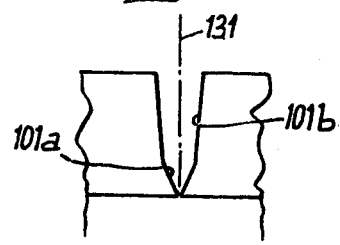
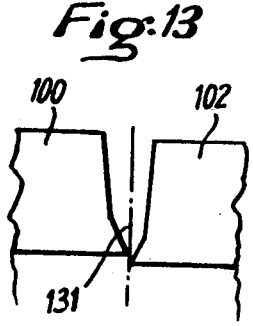
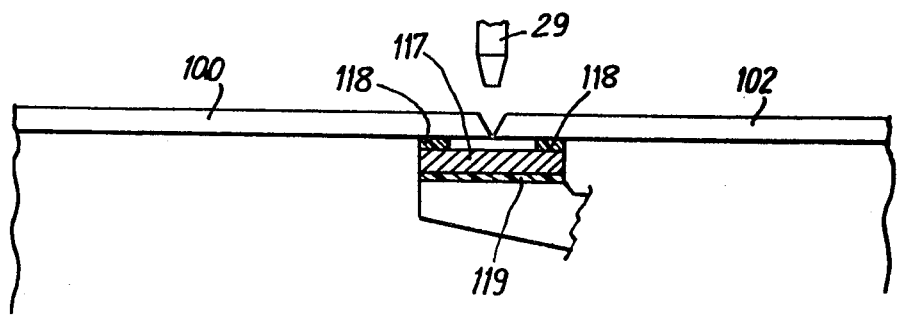
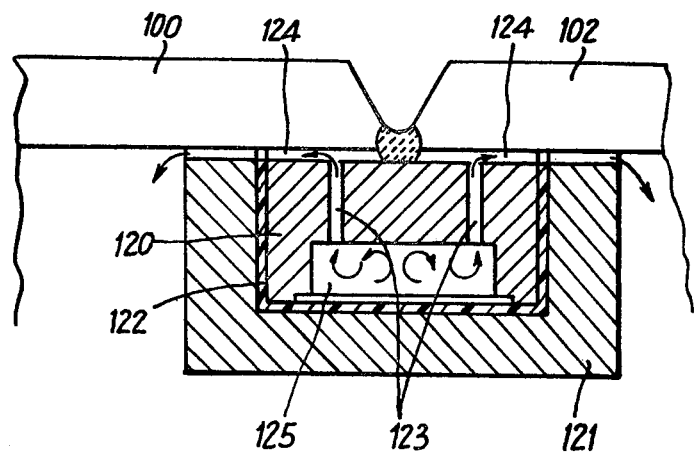

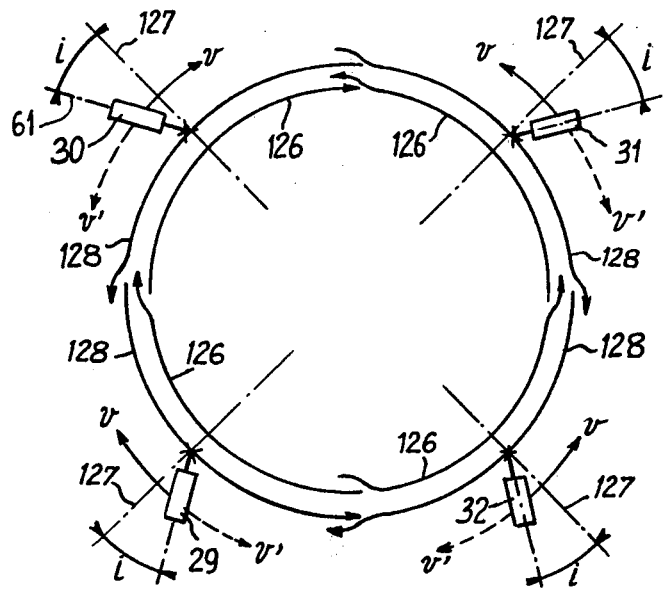
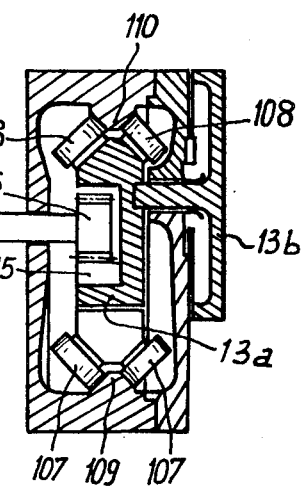
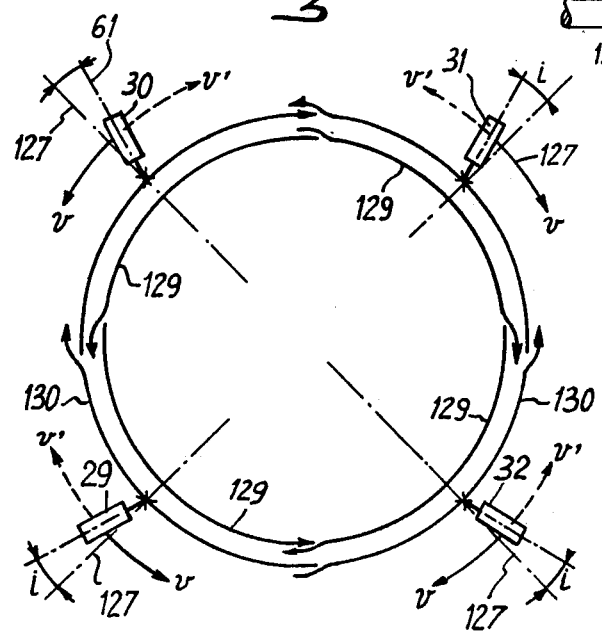

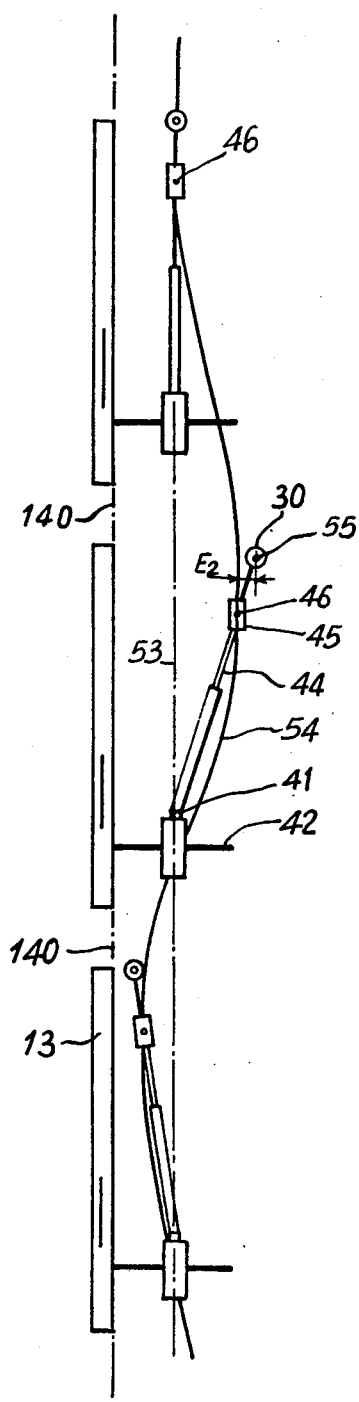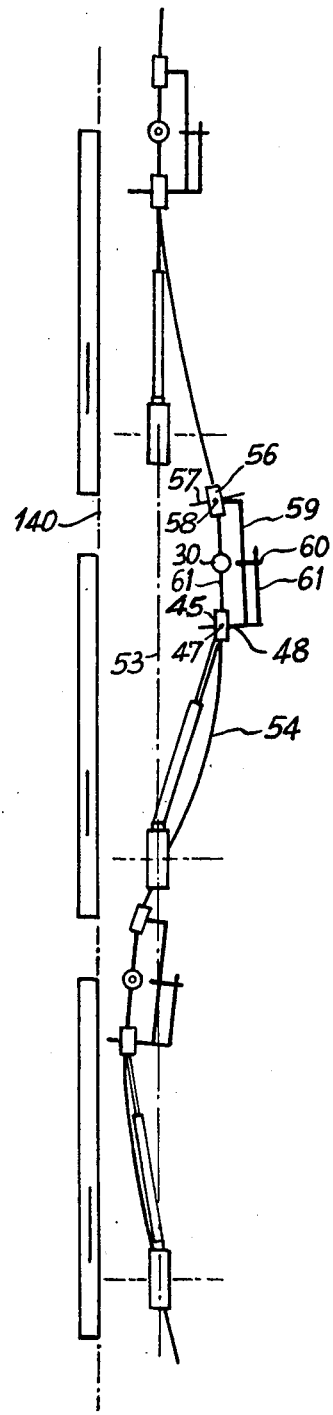

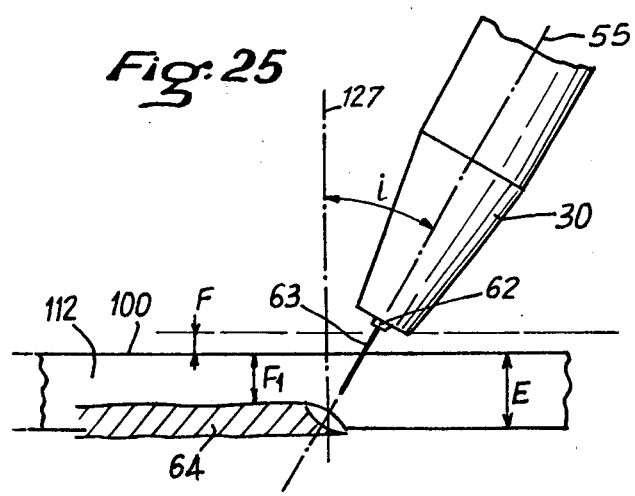
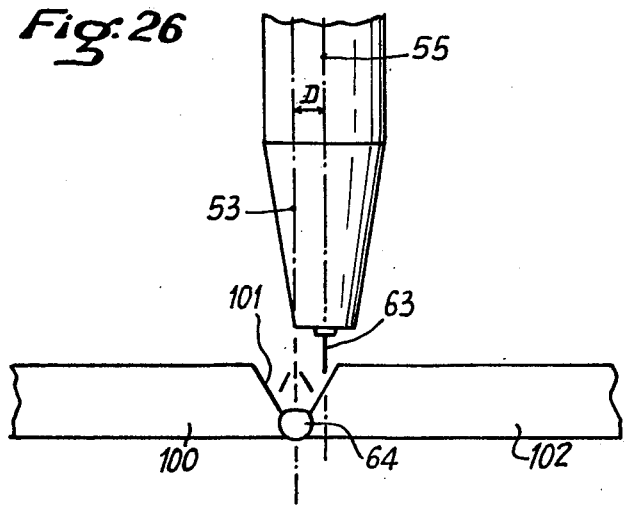
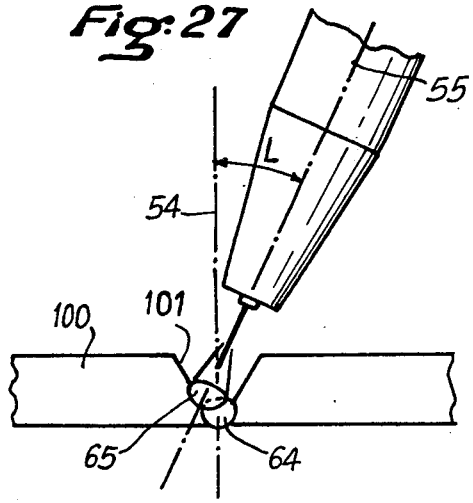
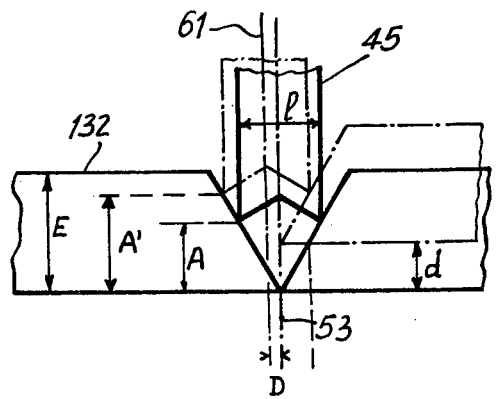

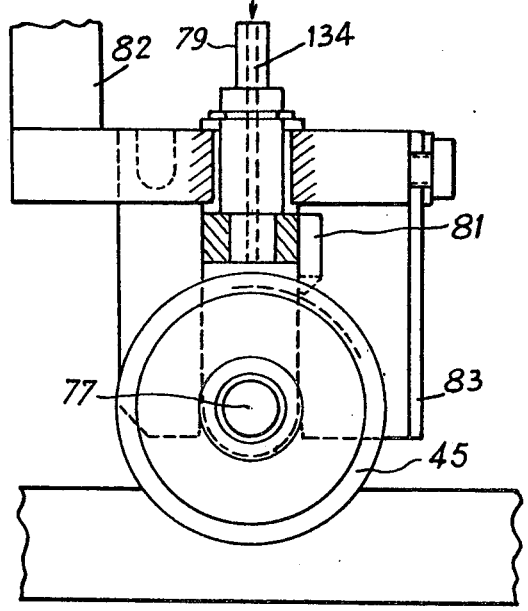
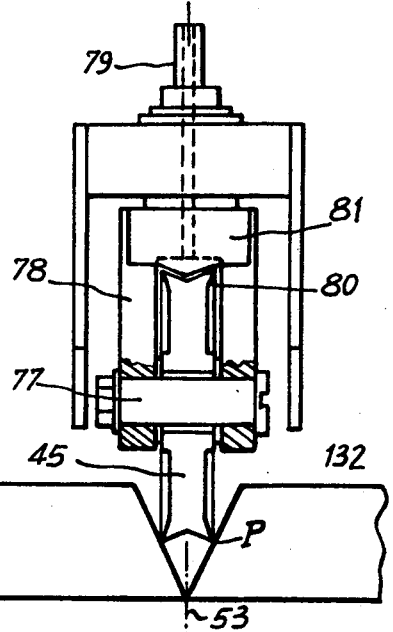
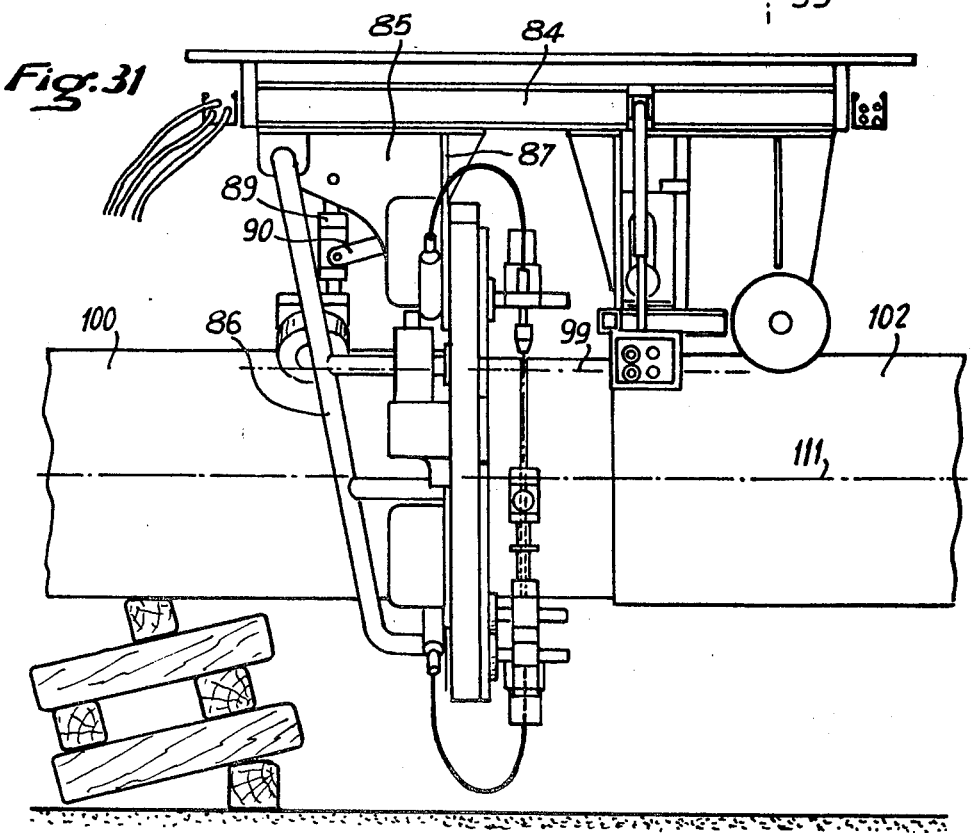

METHOD AND APPARATUS FOR AUTOMATIC WELDING OF BEVELLED TUBES

The invention relates to the automatic welding of bevelled tubes, inter alia pipes or lines or the like adapted to be placed under water.

All known automatic welding apparatus are designed to have regard to many factors concerned in achieving a good-quality weld in the first two welding runs. The first two welding runs are vital because they determine a satisfactory joining of the tubes in the clamped part by the bevels of the tubes, such part subsequently serving as a support for consecutive weld layers produced by the filling runs.

It is known to use special bevels to facilitate automatic welding by some apparatus. Unfortunately, the special bevels are either expensive to contrive, since they must be made to close dimensional tolerances and have more than two changes of inclination, relatively inexpensive but have the disadvantages of requiring the tubes to be at a carefully predetermined distance apart from one another. There are even bevels whereby the tubes can be presented to one another without spacing, a heel being provided at the base of the assembly, but the heel is limited underneath by reverse bevels and above the bevels at approximately 45° followed by flanks at an inclination of approximately 5° to the axis of the groove bounded by the bevels.

According to one aspect of the invention there is provided a method of welding the bevelled ends of two tubes, said tube bevels having no heels, comprising arranging said tubes with a spacing of between 0 and 2 mm, and making a plurality of welding runs, all said runs being made on the outside of said tubes.

The advantage of this method is that it reduces the welding time by reducing the volume of deposited metal necessary as compared with the prior art. Another advantage is the lack of problems arising in the formation of the first run in all systems in which there is a between-tubes gap of more than 1 mm such as the contamination of the deposited metal of copper and from penetration of the weld in all the systems which use a root-face. It has also been found that tubes can be joined together even when there is a high low between them of the order of from 1.5 to 3 mm, the meeting of the tubes making it possible to work on tubes whose end sections may be out of true or even on tubes whose ends are not completely planar.

Preferably the first run and second runs are made consecutively without alteration of the inclination of the axis of the welding means, the first run being a leftward weld, i.e. with the welding means axis inclined, relative to the perpendicular to the welding point, towards the rear of the perpendicular as referred to the movement of the welding means, the second run being a rightward weld, i.e. with the welding means axis in front of the perpendicular relative to the movement of the welding means.

This feature reduces welding times still further as compared with the prior art since the inclination of the welding means axis does not need to be changed and, for instance, two welding means spaced 90° apart from one and reciprocating up and down through 90° can cover 180° of the assembly of bevels in two runs. In particular, the weld produced in the first run is better in proportion as the welding means starts by heating the metal of the bevels in its advance, so that the weld penetrates satisfactorily to the base of the groove bounded by the bevels and cools more rapidly because the welding means is moving away from it. The resulting weld is very well suited to the first run, while in the second run, which is hot and in the opposite direction, there is intimate mixing of the second-run weld with the first-run weld together with softening of the first-run weld.

Welding time can be further reduced while simultaneously improving weld quanlity by using the bevel directly to provide automatic centering of the welding means using articulated locating rollers which are arranged in a plane parallel to a reference plane of the frame of the welding apparatus, the rollers remaining in the meeting plane of the bevels of the two tubes.

The advantage of such a method is to provide rapid and accurate location of the welding means axes relative to the meeting plane of the bevels, it being merely necessary for the axes of welding means supports to be placed perpendicular to the reference plane and for the welding means to be positioned at a predetermined distance from the reference plane for the bevels to be swept solely by angular movement of the welding means support.

The quality of the first run weld can be further increased by obviating any risk of contamination thereof while achieving optimum penetration, by electrically insulating the copper support disposed below the bevels and by leaving a space between the inner surface of the tubes and the copper support, such gap preferably being at most 1 mm.

This feature, it is found, prevents arcing starting on the copper, the molten pool forming immediately between the bevels and staying completely free of copper.

According to another aspect of the invention there is provided apparatus for carrying out the method hereinbefore described, comprising an inverted channel section frame welding means, means mounting said welding means on said frame, and means for causing alignment between a reference plane of said frame and the tube meeting plane.

The apparatus advantageously includes two first bearing means for bearing on an upper part of one of the two tubes to be welded, such bearing means being associated with an attitude corrector serving as a third bearing means for bearing on the other tube, said third bearing means tying in the plane of symmetry of said first bearing means.

The apparatus may also comprise three locating rollers which lie in the plane of the axes of said welding means and are associated with rams for moving said rollers in said plane.

Welding using the method and apparatus described above can therefore be a very simple matter since the apparatus can be located by means of lifting means, it being possible inter alia for the frame of the apparatus to pivot at the end of a suspension link for lowering it on to the tubes so that, once the three locating rollers are engaged in the groove bounded by the bevels, the three bearing means are located on the tubes simultaneously by means of the attitude corrector.

To further facilitate positioning of the apparatus and increase the accuracy of deposition of the automatic runs, the bearing means may comprise rollers, the welding means may be mounted on sectors which run on the frame and whose running plane is taken as the reference plane, and each of the locating rollers, which are angularly offset by 120° from one another, may be mounted on a pivoted device enabling it to engage in the groove bounded by the bevels and enabling the frame reference plane to be moved parallel to the tube meeting plane defined by the locating rollers.

For use with tubes whose meeting plane is not absolutely perpendicular to the tube axes, means may be provided for moving the said bearing means roller substantially perpendicularly to the tube generatrices. Such means are particularly helpful in facilitating location even in the case of tubes which already have a covering.

Advantageously the welding means are pivotable around an axis perpendicular to the reference plane by drive means and are pivotable around an axis parallel to the reference plane. The welding means may also be controlled by feeler or tracking arms carrying rollers engaged in the groove bounded by the bevels. This feature has the advantage of permitting maintenance of a constant distance between the welding means and the centre-plane of the bevels and of making it possible to make the first run, whatever the inclination of the axis of the welding means, without having to use an oscillating device for producing oscillating lateral movement of the welding means.

The feeler arm may be pivotable about a first axis perpendicular to the reference plane and about a second axis perpendicular to the first axis, to keep the feeler roller in engagement with the bevels despite machining faults therein and errors in tube positioning. The feeler roller will therefore always return the welding means automatically to a substantially constant distance from the centre-plane of the bevels, the latter plane being offset from the corresponding ideal centre-plane. This automatic correction of welding means positioning helps to improve weld quality.

The feeler or guide roller is arranged near the molten pool and above the weld bead and the welding means, and is provided with protection means and is radially pivotable. The advantage of this feature is not only to ensure that the roller is effective but also to help reduce the distance between the roller and the welding means so as to improve the accuracy of the weld and avoid obstacles presented by weld bumps on the bevels.

To maintain a constant length of filler rod or wire between the welding means and the weld, the welding means is preferably controlled by the feeler roller and the filler supply reels are mounted on a stationary part of the frame. This feature improves the efficiency of the apparatus by decreasing the inertia of the moving parts of the apparatus and by the regularity of the rate of weld deposition, such regularity being the result of automatic control of the vertical guiding of the welding means by the roller.

To further increase the flexibility of the apparatus a rolling device may be provided in means for carrying the frame of the apparatus, such device being adapted to raise the frame and enable the frame to run on the tubes.

The invention will be more fully understood from the following description of an embodiment thereof, given by way of example only with reference to the accompanying drawings.

In the drawings:

FIGS. 5 to 10 are diagrammatic views of the locating rollers of the apparatus during their positioning;

FIG. 11 shows a bevel shape suitable for two tubes less than 12 mm thick;

FIG. 12 shows a bevel shape for tubes thicker than 12 mm;

FIG. 13 shows the same bevel shape with not aligned tubes;

FIG. 14 is a section through an insulated copper support disposed below the bevels;

FIG. 15 is a cross section of an alternative form of the support of FIG. 14;

FIG. 16 is a diagrammatic view of the welding means and shows the procedure for the first two welding runs;

FIG. 17 is a diagrammatic view of the welding means showing an alternative procedure for the first two welding runs;

FIG. 18 shows the running means of the welding means carriages;

FIG. 21 is a diagrammatic plan view of the guiding means of a welding means;

FIG. 22 is a diagrammatic plan view of a modification of the means of FIG. 21;

FIGS. 25 to 27 are diagrammatic views of the welding means in positions in which it is inclined to and offset from the bevels;

FIG. 28 is a diagrammatic view of a roller engaged with the bevels;

FIG. 29 is a side view of a roller in its mounting;

FIG. 30 is an end view of the roller of FIG. 29;

FIG. 31 is an end view of a modification of means for carrying the frame of the apparatus;

Figure 4:
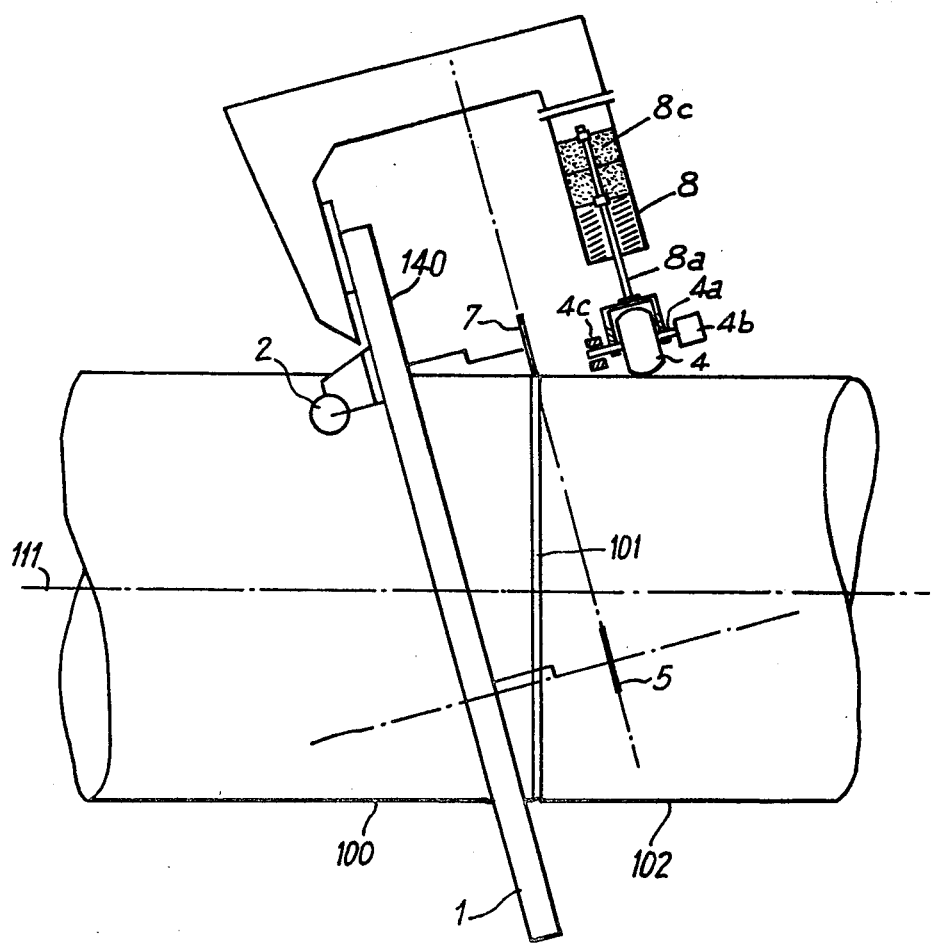
FIG. 4 is a diagram showing the positioning of the apparatus when it is being placed on the tubes.

Referring to FIGS. 1 to 4, the apparatus comprises a frame 1 having bearing means for bearing on tubes 100, 102 to be welded, the bearing means being in the form of rollers 2, 3 which bear on the tube 100 and which are disposed at the rear of the frame 1 (FIG. 4), and a roller 4 resting on the tube 102. The roller 4, as can be seen in FIG. 4, is mounted on a compensating arm 39 at the front of the frame 1 at the end of an attitude-correcting means in the form of an hydraulic actuator or ram 8. The roller 4 has a spindle 4a which is perpendicular to the plane of the frame 1 and which can be driven manually or, if required, by any suitable drive means.

By way of the frame 1 the bearing means are associated with a locating means for locating the frame relative to the meeting plane of the tubes 100, 102, the latter plane theoretically defining the plane of symmetry of bevels 101 of the tubes 100, 102. The locating means comprises three spacing rollers 5 to 7. As can be seen in FIGS. 5 to 8, each roller, such as roller 5, is freely rotatable on a spindle 5a which is mounted in an arm 5b which is pivotable about the axis 5c of a rotatative actuator 5d. The arm 5b can be moved from an inoperative position shown in FIGS. 5 and 6 to a pre-operative position shown in FIGS. 7 and 8, in which position the arm 5b bears against an abutment 5h so that the spindle 5a takes up a preset position perpendicular to the frame 1. In this position, the plane which is perpendicular to the spindle 5a and which contains the three rollers 5 to 7 coincides with the plane containing the axes 103 to 106, visible in FIG. 1, of welding means 29 to 32, e.g. blowpipes.

As shown with reference to the roller 5, the rollers 5 to 7 are moved from their pre-operative positions, as shown in FIGS. 7 and 8, into their operative positions, shown in FIGS. 9 and 10, by actuation of rams, such as ram 5e, the end of whose rod is pivoted to a support arm 5g carrying the arm 5b. The end of the ram rod describes an arc of a circle around a pivot 5f of support arm 5g and moves the roller 5 into the groove defined by the bevels 101.

The main advantage of the positioning system described above is that the position of the welding means 29 to 32 relative to the groove defined by the bevels 101 can be adjusted accurately in a simple manner and quickly. For example, assuming that the apparatus is being lowered on to the abutted tubes by means of a lifting ring 245 shown in FIG. 2, the ring 245 having, for instance, a longitudinal slideway 245a for balancing a suspension link 240 on which the frame 1 is carried, and the plane of symmetry of the rollers 2, 3, which plane coincides by construction with the vertical plane passing through the rotational axis of the roller 4, does not lie on the axis of the tubes 100, 102. Once the apparatus has been moved into a position in which the locating roller 7, in its pre-operative position, is ready to enter the groove between the bevels 101 at the top of the tubes 100, 102, the rollers 2, 3 tend, as they bear on the tube 100, to produce a reaction a self-aligning torque which moves the plane of symmetry of the apparatus into alignment with the vertical plane containing the axes of the tubes 100, 102. The roller 7 can readily be engaged with the bevels 101 by energization at a reduced pressure of the ram 7e (corresponding to the ram 5e of FIGS. 5 and 10) so that the arm 7b retains some resilience around the pivot 7f (corresponding to the pivot 5f of FIG. 10).

Figure 2:
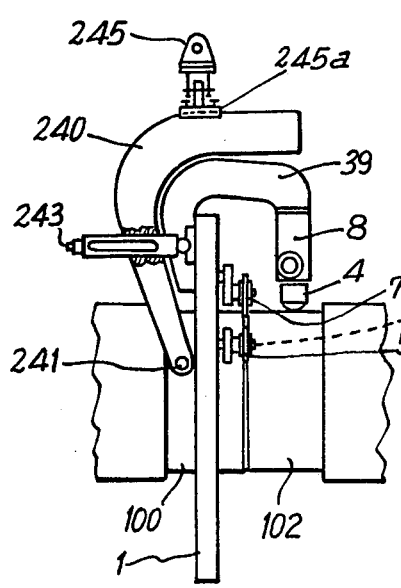
FIG. 2 is a diagrammatic view in side elevation of the apparatus of FIG. 1 and of the means for lifting the apparatus.
Figure 3:
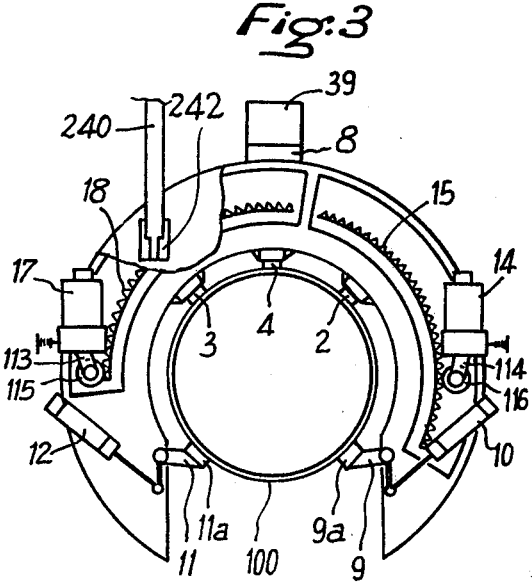
FIG. 3 is a diagrammatic view of the rear of the apparatus of FIG. 1.

Before operation, to facilitate automatic and accurate positioning of the frame 1, the slideway 245a and the inclining facility 243, shown in FIG. 2 and which determines the inclination relative to the suspension link 240 of the frame 1, which is pivoted by way of the elements 241, 242 to the suspension link 240, are adjusted to reduce as much as possible the work which the attitude correcting means 8, secured to the compensating arm 39, has to perform.

If during the step of engaging the roller 7 in the groove bounded by the bevels 101, the frame 1 is in a position such that all the rollers 5 to 7 are in the tube meeting plane, all the rams 5e, 6e, 7e can be operated at full pressure to engage the rollers 5 to 7 in the groove, the rollers being of accurately determined thicknesses. The forces applied by the spacing rollers suffice to move the apparatus on its bearing rollers 2 to 4 and correct its position relatively to the groove defined by the bevels.

If, however, the rollers 5, 6 are in the positions shown in FIG. 4, it is usually sufficient to cause the apparatus to bear on its three rollers 2 to 4 to bring the rollers 5 and 6 into the tube meeting plane, because the ram 8 which urges the roller 4 on to the tube is by construction flexible enough to pivot the apparatus around a horizontal axis until the rollers 5, 6 engage in the bevels, such engagement securing the apparatus in this position, so that, as described above, the tensioning rams 5e, 6e, 7e can be operated at full pressure to position the frame 1 accurately relatively to the tube meeting plane and also the actuating rod of the roller 4 can be secured at the appropriate level by stopping the free flow of oil to the cylinder 8c of ram 8. This step can be supplemented by any other mechanical securing. Also, since the roller 4 can run freely on the top of the tube, its spindle 4a can be secured by a mechanical brake 4c.

Although the apparatus described above is usually sufficient to provide location as described above, even if one or both bevels are out of true and are not disposed in planes perpendicular to the tube axis, the bevel may sometimes be too untrue for automatic location to be possible, particularly if the tube 102 already has a covering of for example pitch which inhibits easy running of roller 4. In exceptional cases of this nature, faulty tubes of this kind can still be welded by facilitating the engagement of the rollers 5 to 7 in the bevel groove by driving the roller spindle 4a mechanically, appropriate means being provided for this purpose. For example, the spindle 4a may have a square end 4b adapted to be engaged by a ratchet spanner or the like. Rotation of the roller 4 produces a torque which boosts the self-aligning torque.

Once the welding means axes have been adjusted accurately in the tube meeting plane defined by the engagement of the rollers 5 to 7 in the groove bounded by the bevels 101, the apparatus can be locked by means of clamping rams 10 and 12 (FIG. 3) and which are disposed at the rear of the frame 1. The rams 10, 12 act by way of clamping arms 9, 11 to apply rubber pads or shoes or the like 9a, 11a, which in shape match the surface of tube 100 intimately, at places diametrically opposite the bearing points of the rollers 2, 3, thus ensuring that clamping obviates even the slightest torque tending to alter the location of the apparatus. The pressures applied by the two rams 10, 12 are so balanced as to obviate any clamping reaction and to keep the apparatus completely immobile after the rollers 5 to 7 have returned to their inoperative positions.

Figure 1:
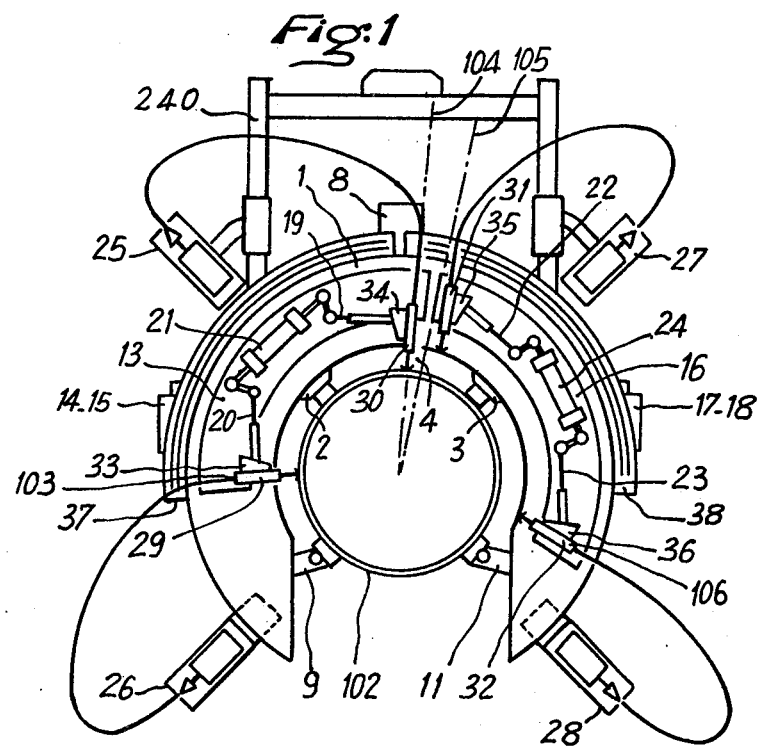
FIG. 1 is a diagrammatic view in elevation of an embodiment of a welding apparatus seen from the front where the welding means are arranged.
Figure 19:
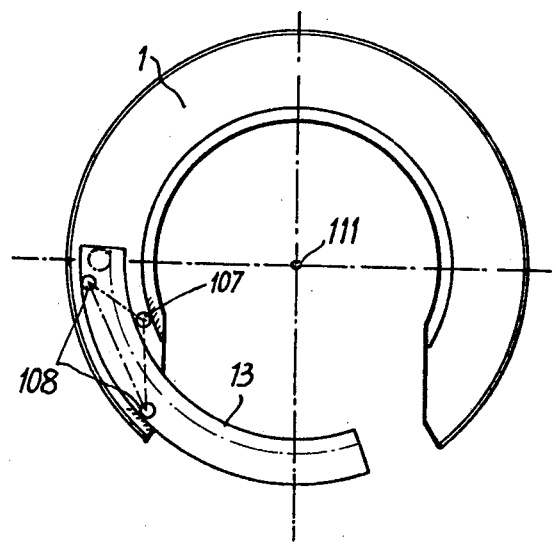
FIG. 19 shows the running rollers of the welding means carriages.

As can be seen in FIG. 1, the welding means 29 to 32 in this embodiment are disposed on two carriages 13, 16, the welding means 29, 30 being disposed near the ends of carriage 13 while the welding means 31, 32 are disposed near the ends of carriage 16. As can be seen in FIGS. 18 and 19 in respect of carriage 13, the carriages 13, 16 run on three carrying devices each comprising three pairs of rollers 107, 108, the rollers 107 running on inclined tracks 109 of frame 1 while the rollers 108 run on tracks 110, each pair of tracks 109, 110 having the same plane of symmetry. The carriages 13, 16 are driven by motors 14, 17 respectively (FIG. 3) which are coupled with appropriate reducers whose sprockets (not shown) drive chains 113, 114 driving gearwheels 115, 116 which mesh with racks 15, 18 rigidly secured to the carriages 13, 16. To reduce clearances, the rollers 107, 108 may be mounted on a spring-biased arm. The rollers 108, 107 of each carrying device, which are disposed on a rigid beam 13a which, together with a plate 13b, forms the carriage 13, are so arranged, as can be seen in FIG. 19, to form a triangular structure adapted to bear on the ends of the frame 1. Accordingly, the spindles of the rollers 107, 108 run on an inner roller way and on an outer roller way respectively, the offset rollers being disposed vertically when the lower end of the carriage 13 passes by and moves away from the vertical plane passing through the axis of the frame 1.

Accordingly, the carrier element 13a of the plate 13b, the beam 13a carrying the welding means 29, 30, is long enough to cover a sector a little greater than 90°.

As can be seen in FIG. 1, the welding means 29 to 32 have respective actuating arms 19 to 23 movable by rams 21 and 24. There can be seen in FIG. 1 reels 25 to 28 of filler material for the welding means. These reels are secured to the frame 1 and disposed symmetrically of the frame 1 so that, unlike the known arrangements in which the reels are disposed on the welding carriages, there is a considerable reduction in the inertias of moving parts, with the direct result of improving weld bead quality, particularly in the first and second runs, since the actual speeds reproduce the reset speeds more accurately despite the stops and starts, which can be quicker and more accurate than has previously been possible. The motor power required is decreased too and the independence of welding is increased appreciably by the very large capacity which the reels can now have. In the embodiment of FIG. 1 the reels 25, 27 are disposed on the suspension link 40 of the frame 1 while the reels 26, 32 are mounted at the bottom of the frame 1. The reels are not shown in FIG. 3 so as not to overload the Figure. The reels can in fact be mounted on any appropriate parts of the apparatus.

Since the apparatus is so constructed that the tube meeting plane can be brought into coincidence with the plane containing the axes of the welding means without having to adjust the welding means supports relatively to the frame 1, it will be apparent that the inclination of the axes of the welding means can be varied merely by pivoting each welding means around the axis of its support 33 to 36, which axes are perpendicular to the plane of the frame 1, the welding means remaining in the meeting plane of the tubes 100, 102 separated by the required distance from the base of the groove bounded by the bevels 101.

Examples of bevel shaping are shown in FIGS. 11 to 13. In the case of tubes less than 12 mm thick, bevels 101 of the kind shown in FIG. 11 and meeting at an angle of 45° or even less are satisfactory. For tubes thicker than 12 mm the base 101a of the bevel (FIG. 12) can be at an inclination of 25° to the meeting plane 131 and the top part 101b can be at an inclination of 5°. The apparatus can also weld tubes with offsets of the order of 2 or 3 mm (FIG. 13), the spacing between the tubes being preferably zero but possibly being of the order of 1 mm or even 2 mm, as may occur if one of the tubes has not been cut completely square or if the end of the tube is not planar.

The advantages which the apparatus provides for automatic welding with a bevel of this kind are the elimination, due to the lack of heel, of all the difficulties arising from the penetration and behaviour of the molten pool. Also, the absence of gap reduces the weight of metal to be deposited and also eliminates the need to start the electric arc of the welding means on the conventional copper support which is disposed below the bevels and which sometimes contaminates the weld by diffusing copper particles.

Whatever kind of bevel is used, copper supports 117 (FIG. 14) which are electrically insulated from the tube, are used to cool the weld and, where applicable, when there is a gap between the tubes. As can be seen in FIG. 14, the support 117 is insulated from the tubes 100, 102 by means of insulating strips 118 and from its own support by means of an insulating strip 119. The copper support may be formed with a groove in vertical alignment with the groove defined by the bevels. Depending upon the kind of bevel, the gap between the tubes and the copper support 117 may be adjustable by means of screws which replace the strips 118 and which are screwed to varying depths in apertures in the copper support 117, which is tapped correspondingly at its four corners. The screws can be round-headed hard steel screws or be made of insulating material, e.g. of Teflon (Trade Mark).

To improve heat removal a copper support 120 of the kind shown in FIG. 15 may alternatively be used, which support 120 is insulated from jaw 121 of the securing device by insulation 122, passages 123, 124 being provided for the flow of a cooling and shielding gas supplied through passage 125.

Whatever kind of bevel is used, the apparatus provides automatic welding by a method differing from the known automatic methods in that, as can be seen in FIG. 16, the first run 126 is made with the welding means 29 to 32 rising, each welding means being at an inclination i of between approximately 15° and 30° to and in front of the normals 127 to the welding spot passing through the central axis of the tube, and so as to make a leftward weld, the first run being followed by a second descending run 128 without alteration of welding means position so as to make a rightward weld. The second run 128 can be made in the presence of $CO_2$ and argon.

In a modification shown in FIG. 17, the first run 129 is a downward run but with the welding means axis at an inclination i of the order of 5° to 10° and to the rear of the normal 127 so as to make a leftward weld as in FIG. 16, whereafter the second run 130 is a rising run with the same welding means axis inclination and is a rightward weld. FIG. 25 shows a rightward weld.

In the two embodiments illustrated in FIGS. 16 and 17, automatic welding without manual intervention is obtained, the first leftward weld, whether with a rising or descending run, having as its main advantage the boosting of the preheating of the metal where the weld is deposited and the speeding up of the solidification of the molten pool. These results are even more marked when the first run is a rising run as run 126. This feature facilitates the adaptation of any required shielding-gas facility and in particular makes it possible to use pure $CO_2$. Weld penetration is wide and deep and the weld melts completely at the root of any kind of bevel with or without a gap between the tube ends. A satisfactory weld can therefore be produced automatically without any need to alter the angle of incidence of the welding means.

Figure 20:
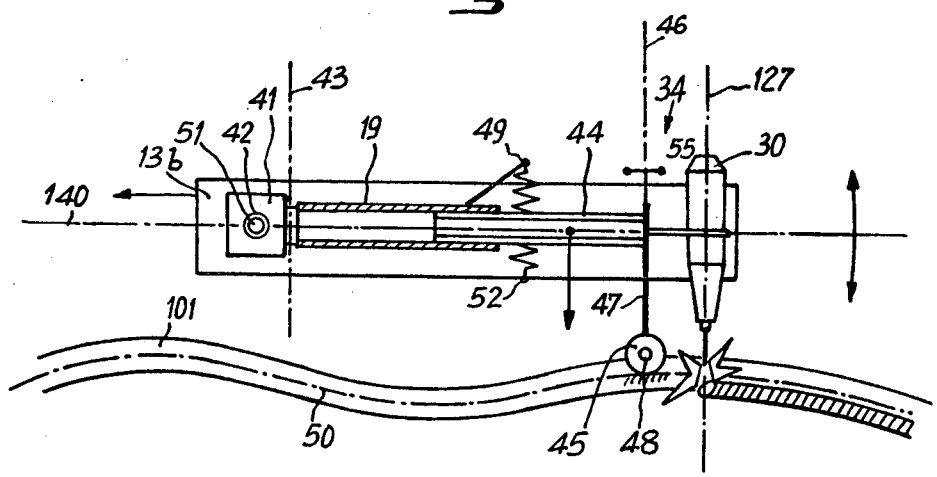
FIG. 20 is a diagrammatic end view of a welding means guiding arm.

To ensure satisfactory welding of the tubes despite defects in them and whatever their diameters and bevels, the welding means supports 33 to 36 are controlled by a feeler in the form of a roller 45 shown in FIGS. 20 and 21, where the system 34 supporting the welding means 30 is shown diagrammatically. Unlike the known apparatus, the welding means 30 is controlled by the roller 45 which is guided by the bevel 101; the shape thereof in a plane parallel to the plane 140 in which the carriage 13 and its plate 13b move should be regular.

Roller 45 runs on contact line 50 of bevel 101 and rotates around a shaft 48 disposed at the lower end of a vertically adjustable column 47, the roller 45 also being pivotable around a vertical axis 46. Column 47 is rigidly secured to welding means 30 and to an arm 44 sliding inside the carrier arm 19. The arm is secured to a slideway 41 by way of a spindle 43 which enables the arm 19 to follow lateral displacements of the roller 45 due to variations in the distance between the bevel 101 and the plane 140 in which the elements 13, 13b move. The slideway 41 is movable on a shaft 42, whose axis 51 is perpendicular to the plane 140, so as to align the arm 19 with the ideal theoretical centre plane 53 (FIG. 21) of the bevel, which plane 53 should be parallel to the plane 140. A spring 49 applies the roller 45 to bevel 101 by pulling on arm 19, spring 49 bearing at a point 52 on the plate 13b.

In FIG. 21 there can be seen the actual bevel centre-plane 54. Although a marked defect of the bevel may deflect the welding means 30 from the trace 54, the deflection $E_2$ is at most 0.5 mm and is tolerable, first because of the reduced distance between welding means axis 55 and the axis 46 of the roller 45, so that the maximum deviation $E_2$ is small, and second because the traces 54 overlap one another so that the average deflection is very small.

If complete elimination of the deviation $E_2$ is required, the welding means 30 can be controlled by means of two rollers 45, 56 as shown in FIG. 22. Roller 56 has its horizontal spindle 57 rotatable around a vertical steel rod or spindle or the like 58 connected to an arm 59 pivoted to a pivot 60 on a plate 61. Arm 59 carries the horizontal spindle 48 of roller 45 while plate 61 carries the vertical spindle 47 of roller 45 and the welding means 30. Whatever differences there may be in orientation around the spindles 47, 58, this feature makes it possible to retain the welding means axis on the trace 54, the plate 61 always remaining parallel to the chord joining the spindles 47 and 58 due to the plate 61 being controlled by the roller 56 by way of the vertical member 58.

Figure 23:
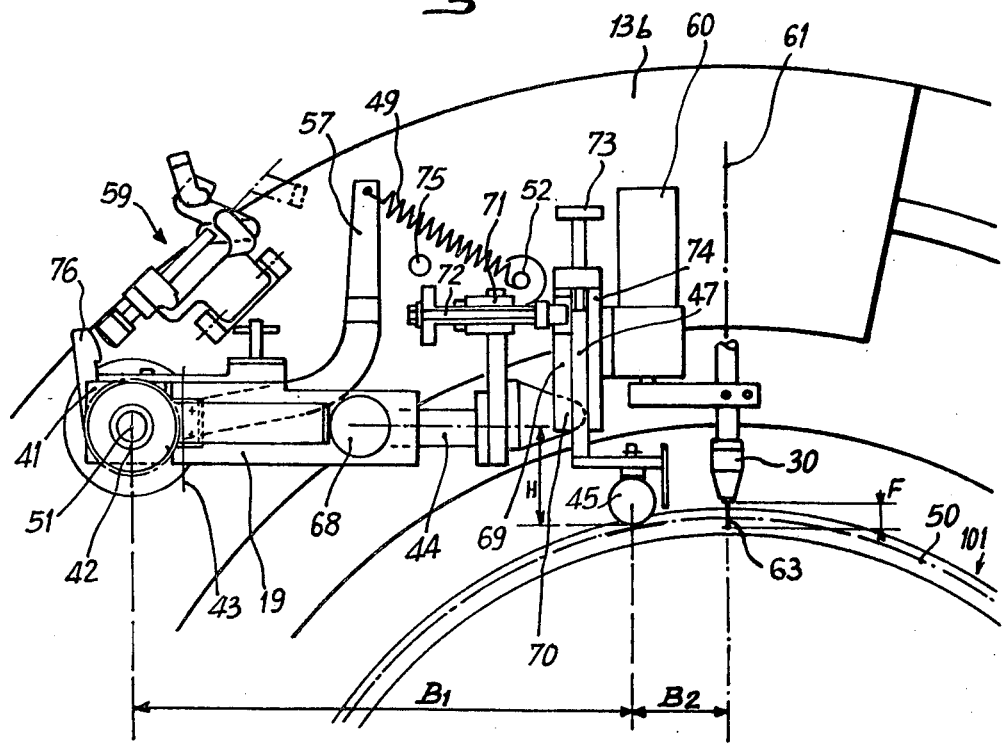
FIGS. 23 and 24 are views in elevation and plan respectively of an embodiment of a guide arm.
Figure 24:
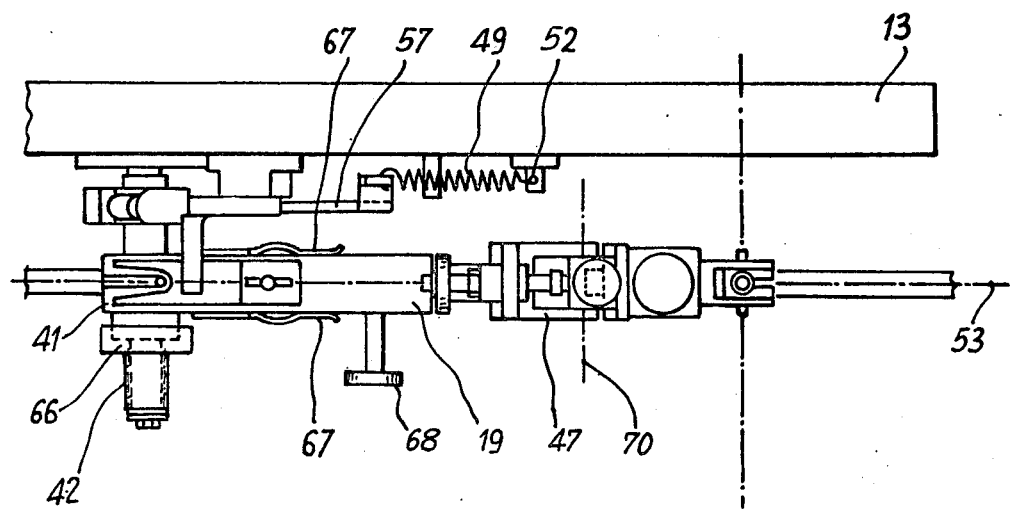

FIGS. 23 and 24 show an embodiment of a system carrying the welding means 30 under the control of the roller 45 guided by the bevel 101. FIGS. 23 and 24 show the plate 13b carrying the system by means of shaft 51, sliding on which, with the interposition of a hollow spindle 42 concentric with shaft 51, is slideway 41. Arm 19 pivots around a vertical axis 43, arm 44 sliding inside arm 19. Spring 49, secured at 52 to plate 13b, biases lever 57 to bias roller 45 into the bevel. Lever 57 transmits the force of spring 49 to arm 19. An oscillator 60 of any known kind for causing oscillation of the welding means 30 is secured to plate 69.

As has been seen, one of the main advantages of the welding means being guided by means of a roller forced by its dimensions to bear on the bevels as it moves over them, is that the welding means is maintained in the centre-plane of the bevels despite misshaping thereof. Consequently, once the radial inclination i of the axis 55 (FIG. 25) of the welding means 30 relative to the normal 127 has been determined, assuming the depth E of the groove defined by the bevels 101, the distance F between the welding means nozzle 62 and the outside surface of tube 100 and the distance $F_1$ from the nozzle 62 to the weld bead 64 being formed are known, the length of fusible wire 63 issuing from the nozzle 62 can readily be maintained constant. More particularly, the welding means axis 55 follows the bevel groove so accurately despite defects therein that there is substantially no offsetting D (FIG. 26) of the axis 55 either from the centre-plane 54 of a regular bevel or from the actual centre-plane 54 offset from the theoretical centre-plane 53 because of misshaping of the bevels. Offsets of this kind cause variations in the length of the wire 63 and, at high arc speeds, weld quality depends upon accurate positioning of the welding means.

In addition to adjustment of the inclination i so as to obviate the need to use an oscillator 60, the lateral inclination L (FIG. 27) of the welding means axis 55 in relation to the theoretical and actual bevel centre-planes 53 or 54 is preliminary adjusted. The weld bead 64 (FIG. 27) of the first run is topped with a weld bead 65 on the surface of the bevel 101. This welding procedure improves weld quality, heating by the welding means being more regular in proportion as all the distances affecting weld quality are maintained constant, in contrast to the known procedures in which the welding means oscillates for the first run.

In the example shown in FIG. 24, the adjustment for aligning the welding means axis 55 with the centre-plane 53 is effected by the slideway 41 being moved by means of a system using a nut 66 rotating on a screw-threaded part of the spindle 42. This device and the means for securing the slideway 41 in this position can actually be of any kind. Similarly, movement of the arm 19 or of its extension 44 around the pivot 43 for lateral follow-up of the bevel can be controlled by any appropriate means, inter alia adjustable abutments which are not shown in order not to overload the drawings. The provision of flat springs 67 rigidly secured to the slideway 41 and biasing the arm 19 in the direction 53 help this lateral follow-up. Consequently, should the roller 45 disengage from the bevel 101 accidentally, it would immediately be returned to its normal position. The distance $B_1$ between the spindle 51 and the spindle of the roller 45 can be fixed, after the arm 44 has been moved, by means of a thrust screw 68.

The inclination angle i is adjusted by rotation of plate 69 around spindle 70 by means of a nut device 71 in which an adjusting screw 72 pivoted to the plate 69 is threaded.

The length F of the filler wire 63 (FIGS. 23 and 24) is adjusted by means of a screw 73 which moves relatively to the plate 69 and displaces the column 47 carrying the roller 45. The distance H through which the roller 45 must move to contact the bevel on the line 50 and which thus determines the length F of the wire 63 is adjusted by varying the position of the roller 45 relatively to the plate 74 carrying the oscillator 60 and welding means 30.

The thrust torque produced by the spring 49 and lever 57 can be adjusted by varying e.g. the angular position of the lever 57 on the arm 19. The pressure applied to the roller 45 can thus be adjusted to a predetermined value.

An abutment 75 (FIG. 23) is provided to limit the movement of the lever 57, and therefore the movement of the arm 19, in the absence of a tube.

A device 59, which can be controlled e.g. manually or pneumatically, acts by way of an eccentric movable nosepiece 76 of the lever 57 to return the arm 19 to its raised position.

As can be seen in FIG. 28, the roller 45 has a width l determined in dependence upon the angle which the bevel makes with the centre plane 53 and upon the tube thickness E. The value l can be determined when the height A of the track on which the roller is required to bear is known.

The width of the roller 45 is determined so that either the roller runs along a track half way through the thickness of the tube for the first and second runs or so that it runs very close to the outside surface 132 for the final runs. In the latter case consideration must be given to possible mis-positioning of the tubes shown in FIG. 28 as the result of a level offset d which shifts the roller 45 from the height A to the height A', so that roller width l must be decreased. The width l can be, for instance, of the order of: ps
$$1.8(E-S)D/d,$$

where $S = A' - A$ and D is the lateral offset.

Clearly, any level offset d causes automatic correction of welding conditions by producing a displacement D of the welding means axis 55, the welding means moving towards the bevel 101 of the lower tube, so that the welding means penetrates better and melting is therefore better.

Also, the roller 45, being pivotable around a vertical axis, pivots slightly upon meeting weld projections stuck to the bevels and therefore negotiates such projections instead of moving vertically in a manner detrimental to the weld, as is the case in the known apparatus in which any welding means supporting rollers run on the tube surfaces.

The roller 45 shown in FIGS. 29 and 30 rotates around a pivot 77 in a yoke 78 pivoting around a radial pivot 79. The pivot 79, which is perpendicular to the pivot 77, forms the means for automatically orienting the roller 45 so that its plane of symmetry is brought into the centre plane 53 of the bevels and so that it bears thereon at the level P. The roller is made of hard steel and is shaped to run accurately on the bevels even when the bearing edges of the roller are near the tube outside surface 132. The roller running edges 80 are angled at 45° and so inclined that their bisectors are inclined to the contact points P at an angle of 45° to the centre plane 53. This feature reduces the risks of the roller encountering weld projections on the bevels. Also, the 135° V-shaped opening obviates any contact with an over-close or accidentally over-convex weld bead or one which may have too prominent projections.

To obviate the accumulation of weld projections on the roller, the yoke 78 which is also made of hard steel, follows the side surfaces of the roller intimately and with a very reduced clearance. A blade 81 cut to 135° and rigidly secured to the yoke 78 extends into the V-shaped groove of the roller to prevent any weld projection from sticking therein. The yoke and roller are disposed on an arm 82 rigidly secured to the column 47. The distance $B_2$ (FIG. 23) between the roller axis and the pivot 61 can be varied by moving the pivot 79 in a slot in arm 82. This feature has not been shown in detail so as not to overload the drawings. The roller is also protected by a copper shield 83 which may or may not have an asbestos plate to protect the mechanism for detecting weld projections. The weld-shielding gas is supplied through a passage 134 inside the pivot 79 to cool the roller.

Another advantage of this form of welding means guiding is that it enables commercially available welding means and oscillators to be used since their qualities and defects do not have any effect on the qualities achieved by the automatic guidance provided by the feeler during the filling and finishing runs in which the molten metal is spread out and the two side surfaces of the bevel are melted to the same depth; it is found that the mechanism described still maintains a very low mis-positioning of less than 1 mm between the welding means axis and the centre plane 53, thus obviating any sticking to one of the bevel surfaces. The reason is that retention of the arm 19 (FIG. 24) in the centre plane 53 is achieved despite the presence of matching tolerances or of displacements in bringing the tubes together so that bevel width varies, and so the welding means oscillations remain symmetrical. Automatic compensation for the thickness of weld deposited, for instance, because of the bevel shrinking, is achieved by the roller rising automatically into the narrower zone, so that filler wire length can remain constant. There is a similar compensation in the event of the bevel widening. Also, since the arm 19 is in its centre plane instead of the welding means, it becomes unnecessary to have amplitude correction of the movement of the welding means produced by the oscillator 60, the automatic guiding simultaneously increasing the flexibility of the apparatus in any welding conditions.

The features described may be course be varied in many ways without departing from the scope of the invention. For instance, the frame 1, instead of being mounted in the apparatus by way of the suspension link 240, may be disposed on a beam 84 (FIG. 31) so devised that its axis is parallel to the axis 111 of the tubes 100, 102 and is also disposed in the vertical centre plane thereof. The beam 84 has at its rear a double square bracket 85 made of sheet metal and tubing which serves to carry and stiffen the frame 1 and to carry a sill, sole or the like 87 for securing to the beam 84.

When two tubes have been welded by the method hereinbefore described and it is required to make the next weld, either the tubes can be moved to bring the new bevels below the frame 1 or the frame 1 can be moved while the tubes remain stationary, the frame 1 being moved by rollers which are rigidly secured to the beam 84 running on the upper generatrices of the tubes.

Figure 32:
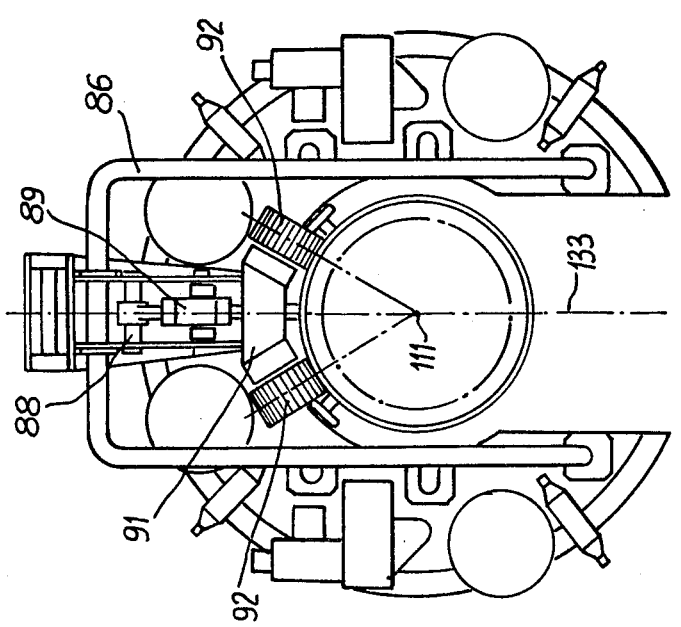
FIG. 32 is an elevation of the rear of the carrying means of FIG. 31.

To this end, the members 85 carry a pivot member 88 (FIG. 32) and around which pivots the head of a hydraulic or pneumatic ram 89 articulated to linkage 90 and rigidly secured to an axle 91. The axle 91, which is symmetrical with the centre plane 133, carries two wheels 92 at an inclination of e.g. 35° to the centre plane 133 so as to run normally along the generatrices defined by the angles of 35° at the centre.

Figure 33:
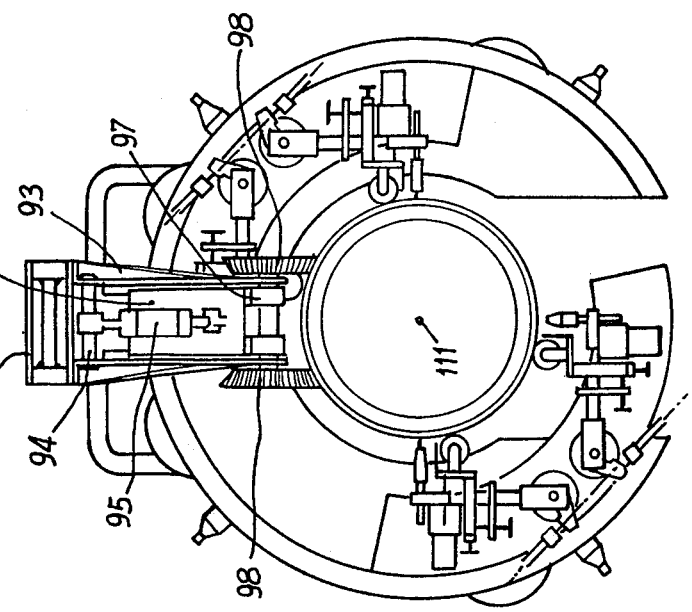
FIG. 33 is a view of the front of the frame-carrying means.

A similar arrangement is disposed at the front of the beam and is secured to square brackets 93 (FIG. 33), the arrangement having a pivot member 94 carrying the head of a ram 95. The ram 95 moves a sliding column 96, the guiding of which has not been shown so as not to overload the drawing and which has an axle 97 a its lower end. Two vertical wheels 98 are adapted to run on two generatrices of the tube each at a 15° inclination to the centre plane.

Operation of the rams 89, 95 raises the beam 84 and therefore the frame 1, the weight of the apparatus resting on the wheels 92, 98. The axles 91, 97 can be driving axles. The rims of the wheels 92, which are drivable wheels, are made of appropriately hard rubber to ensure satisfactory adhesion to the tubes, the level contact of the wheels with the pipes is low relative to the level of the axis 133 to improve stability during running. The front wheels 98 are narrower than the wheels 92 and are made of steel so as to adhere less to the tubes. Consequently, they cannot produce any torque tending to make them rise to higher generatrices of the tube and they therefore contribute towards simple and reliable movement of the frame.

In contrast to the known systems, the apparatus described above does not need to be disconnected from the tubes when changing over from one weld to the next nor does it need to be transported by vehicles having lifting tackle nor does it need to use beams for securing to the tubes, all the positioning and displacing operations being performed by the apparatus itself. The result is therefore not only very good quality welds without manual intervention but also high outputs and no down time when the apparatus is moved. Because of its shape, and of its lifting system, the apparatus can readily avoid obstacles in the form of any kind of tube support.

We claim:

1. A method of welding the bevelled ends of two tubes using an automatic welding device, said tube bevels having no root-faces, comprising (a) arranging said tubes into contact with a local gap varying between 0 and 2 mm; (b) automatically positioning said entire welding device in a predefined relationship with the plane defined by the meeting plane of said tubes; and (c) making a plurality of welding runs, all said runs being made on the outside of said tubes.

2. A method according to claim 1, comprising making the first and second runs with a plurality of welding means consecutively, one of said runs being a rising run wherein said plurality of welding means are rising and the other of said runs being a descending run wherein said plurality of welding means are descending, said run being made with the axis of the welding means inclined at a constant angle to the normal of said tubes.

3. A method according to claim 2, wherein said first run is a leftward run.

4. A method according to claim 3, wherein said angle of said welding means axis is from approximately 15 to 30 degrees when said first run is rising and from approximately 5 to 10 degrees first run is descending.

5. A method according to claim 2, wherein said first and second runs are made with said welding means retained mechanically with the axis thereof in the meeting plane of said tubes.

6. A method according to claim 5, including moving said entire welding device into said tube meeting plane by means of a set of three rollers disposed in the plane including said welding means axis plane and adapted to be moved into said tube meeting plane.

7. A method according to claim 5, comprising cooling the mechanism for automatically maintaining said welding means in said tube meeting plane by causing weld-shielding gas to flow thereover.

8. A method according to claim 1, comprising the use of a copper weld-cooling support and maintaining said runs free of copper contamination by electrically insulating the copper weld-cooling support from said tubes and from the support thereof.

9. A method according to claim 8, comprising intensifying cooling of said weld by causing a gas to flow through passages in said copper support.

10. A method of welding the bevelled ends of two tubes using an automatic welding device, said tube bevels having no root-faces, comprising (a) arranging said tubes into contact with a local gap varying between 0 and 2 mm; (b) automatically positioning said entire welding device in a predefined relationship with the plane defined by the meeting plane of said tubes by moving said entire welding device into said tube meeting plane by means of a set of three rollers disposed in the plane including said welding means axis plane and adapted to be moved into said tube meeting plane; and (c) making a plurality of welding runs, all said runs being made on the outside of said tubes.

11. A method of welding the bevelled ends of two tubes using an automatic welding device, said tube bevels having no root-faces, comprising (a) arranging said tubes into contact with a local gap varying between 0 and 2 mm; (b) automatically positioning said entire welding device in a predefined relationship with the plane defined by the meeting plane of said tubes; (c) making a plurality of welding runs, all said runs being on the outside of said tubes, wherein said runs are made with said welding means retained mechanically with the axis thereof in the meeting plane of said tubes; and (d) cooling the mechanism for automatically maintaining said welding means in said tube meeting plane by causing weld-shielding gas to flow thereover.

* * * * *